United States Patent

Louks et al.

Patent Number: 6,099,670
Date of Patent: Aug. 8, 2000

[54] ULTRASONIC BONDING METHOD

[75] Inventors: John W. Louks, Hudson, Wis.; Donald L. Pochardt, Hastings, Minn.; Desmond T. Curran; Christopher P. Henderson, both of Durham, United Kingdom

[73] Assignee: 3M Innovative Properties Company, St. Paul, Minn.

[21] Appl. No.: 09/151,619

[22] Filed: Sep. 11, 1998

[51] Int. Cl.[7] ........................................ B32B 31/00
[52] U.S. Cl. .................. 156/73.1; 156/580.2; 264/444
[58] Field of Search ................ 156/73.1, 73.2, 156/73.3, 324, 553, 555, 580.1, 580.2; 264/442, 443, 444

[56] References Cited

U.S. PATENT DOCUMENTS

| | | | |
|---|---|---|---|
| 4,534,818 | 8/1985 | Kreager et al. | 156/466 |
| 4,668,316 | 5/1987 | Sager | 156/73.1 |
| 4,681,645 | 7/1987 | Fukushima et al. | 156/73.1 |
| 5,057,182 | 10/1991 | Wuchinich | 156/580.1 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,562,790 | 10/1996 | Ehlert et al. | 156/73.1 |
| 5,645,681 | 7/1997 | Gopalakrishna et al. | 156/580.2 |
| 5,707,483 | 1/1998 | Nayar et al. | 156/580.2 |
| 5,735,984 | 4/1998 | Hoff et al. | 156/73.3 |
| 5,879,493 | 4/1998 | Johnson et al. | 156/73.3 |

FOREIGN PATENT DOCUMENTS

2 507 531  12/1982  France .
2 282 559   4/1995  United Kingdom .

OTHER PUBLICATIONS

Dukane Ultrasonics (Brochure), 1995.
Herrmann Ultrasonics (Brochure), Ultrasonic Bonding and Cutting of Nonwovens, Textiles, Film and Paper Non–Contact/Non–Wear.
Data Sheet PW–45, Branson Ultrasonics Corporation, 1992.
"Sonic Kit—High Speed Sonic Welding Kit," Cera, France (Brochure).
"Rotosonic 250T Ultrasonic Seaming Machine", Cera, France (Brochure).
"Ultrasonic Cylinder Arm Machines," Sonobond Ultrasonics (Brochure).
"Ultrasonic Lace Maker and Sewing Machine," LaceMaster 20 Series, Sonobond Ultrasonics (Brochure).

*Primary Examiner*—James Sells
*Attorney, Agent, or Firm*—Charles D. Levine

[57] ABSTRACT

A method of high speed bonding at least one material includes applying acoustic energy, using an acoustic horn and an anvil, to the material. The method also includes applying force to at least one of the horn and the anvil to yield a peak pressure between the horn and the anvil of at least $2.068 \times 10^7$ N/m$^2$. The acoustic energy and pressure are applied for a time sufficient to create bonds in the material such that the material is sufficiently quenched before reducing the pressure. The method can include applying acoustic energy at an amplitude of vibration selected in combination with the frequency of vibration to yield an acoustic velocity of no greater than 4.72 m/s.

19 Claims, 1 Drawing Sheet

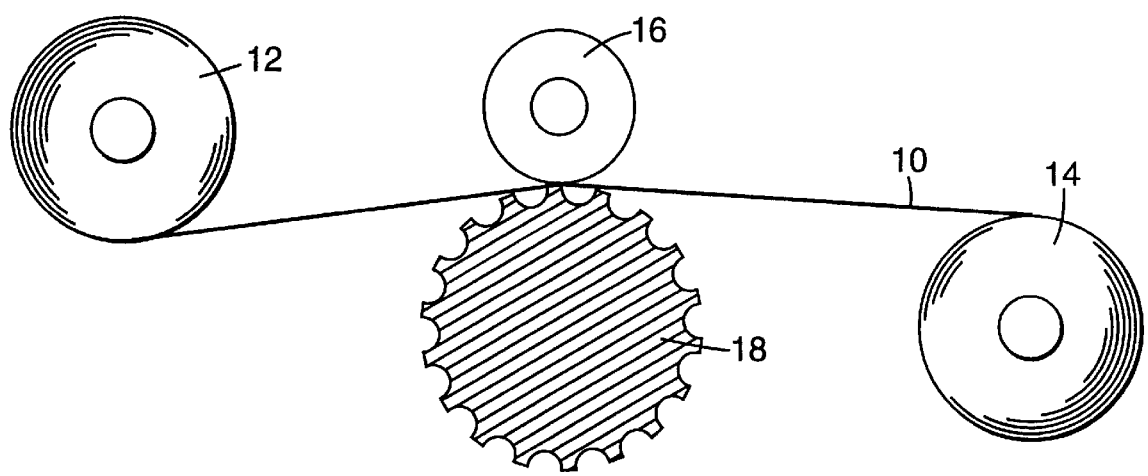

ULTRASONIC BONDING METHOD

TECHNICAL FIELD

The present invention relates to ultrasonic bonding. More particularly, the present invention relates to ultrasonic bonding at high speeds.

BACKGROUND OF THE INVENTION

Ultrasonics is the science of the effects of sound vibrations beyond the limit of audible frequencies. The object of high power ultrasonic applications is to bring about some permanent physical change in the material treated. This process requires the flow of vibratory energy per unit of area or volume. Depending on the application, the resulting power density may range from less than a watt to thousands of watts per square centimeter. Although the original ultrasonic power devices operated at radio frequencies, today most operate at 20,000–69,000 Hz.

Ultrasonics is used in a wide variety of applications. For example, ultrasonics can be used for dust, smoke and mist precipitation; preparation of colloidal dispersions; cleaning of metal parts and fabrics; thermoplastic bonding; the formation of catalysts; the degassing and solidification of molten metals; metal welding; the extraction of flavor oils in brewing; electroplating; drilling hard materials; fluxless soldering; and nondestructive testing such as in diagnostic medicine.

Ultrasonic force is used to perforate sheet materials. U.S. Pat. No. 3,966,519 discloses perforating non-woven webs. The ultrasonic energy amount is controlled by applying a fluid to the area where the ultrasonic energy is applied. U.S. Pat. No. 3,949,127 discloses perforating non-woven webs by applying intermittent ultrasonic fusion to the web and then stretching the web to break the most intensely fused regions causing perforations to form in the web. U.S. Pat. No. 5,269,981 discloses perforating a thin nonporous film which requires applying a liquid to the film before subjecting it to ultrasonic vibrations. U.S. Pat. No. 5,735,984 discloses forming apertures in an adhesive coated non-woven or foam sheet where the height of the flattened raised areas on the anvil is equal to or less than the thickness of the sheet material and adhesive.

Ultrasonic forces are used in welding sheet materials. U.S. Pat. No. 3,697,357 discloses welding sheets made entirely or partially of thermoplastic material or fiber by sealing an area of material. U.S. Pat. No. 3,939,033 discloses using ultrasonics to simultaneously seal and cut thermoplastic textile material. U.S. Pat. No. 5,061,331 discloses an ultrasonic cutting and edge sealing apparatus for cutting and sealing semi-permeable and at least partially thermoplastic fabric.

In acoustic bonding or welding, such as ultrasonic welding, two parts to be joined (typically thermoplastic parts) are placed directly below an ultrasonic horn. In plunge bonding or welding, the horn plunges (travels toward the parts) and transmits ultrasonic vibrations into the top part. The vibrations travel through the top part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In the continuous mode, typically the ultrasonic horn is stationary and the part is moved beneath it. Scan welding is a type of continuous welding in which the plastic part or web material is scanned beneath one or more stationary horns. In rotary horn welding, a rotating horn is used typically in conjunction with a rotating anvil. In traverse welding, both the table over which the parts pass and the part being welded remain stationary with respect to each other while moving underneath the horn or while the horn moves over them.

Many uses of ultrasonic energy for bonding and cutting thermoplastic materials involve ultrasonic horns. A horn is an acoustical tool usually having a length of a multiple of one-half of the horn material wavelength and made of, for example, aluminum, titanium, or steel that transfers the mechanical vibratory energy to the part. (Typically, these materials have wavelengths of approximately 25 cm (10 in).) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations.

Traditionally, ultrasonic cutting and welding use horns which vibrate axially against a rigid anvil, with the material to be welded or cut being placed between the horn and anvil. Alternatively, in continuous high speed welding or cutting, the horn is stationary while the anvil is rotated, and the part passes between the horn and the anvil. In these cases, the linear velocity of the part is matched with the tangential velocity of the working surface of the rotating anvil.

However, drag between the part and the horn can cause stress in and around the weld area during welding. Additionally, closure or nip forces also create stress in the bond area. These factors affect the weld quality and strength which, in turn, limit the line speeds.

One way to minimize these limitations is to shape the working surface of the horn to attain a progressive convergent or divergent gap depending upon the part. This can reduce the stresses but does not eliminate the drag stress. A carrier web can virtually eliminate drag stress.

Another way to attain high quality and high speed ultrasonic welds is to use a rotary horn with a rotating anvil. This system can reduce or eliminate the drag stress during the weld. Typically, a rotary horn is cylindrical and rotates around an axis. The input vibration is in the axial direction and the output vibration is in the radial direction. The horn and anvil can be two cylinders close to each other, rotating in opposite directions with substantially equal tangential velocities. The part to be bonded passes between these cylindrical surfaces at a linear velocity which equals the tangential velocity of these cylindrical surfaces. Matching the tangential velocities of the horn and the anvil with the linear velocity of the material can minimize the drag between the horn and the material. The excitation in the axial direction is similar to that in conventional plunge welding.

U.S. Pat. No. 5,096,532 describes two classes of rotary horn. The patent compares a commercially available rotary horn, manufactured by Mecasonic of Annemasse France (Mecasonic horn) and a rotary horn described in the '532 patent. The shape of the '532 horn differs from that of the Mecasonic horn; the '532 horn is solid, and the Mecasonic horn is a partially hollowed cylinder.

The Mecasonic horn is a full wavelength horn. The axial vibration excites the cylindrical bending mode to provide the radial motion, and the mode of vibration depends on Poisson's ratio. The radial motion of the weld face is in phase with the excitation, and there are two nodes for the axial motion, and two nodes for radial motion. The '532 horn is a half wavelength horn. The axial vibration provides the radial motion. The mode of vibration is independent of Poisson's ratio. The radial motion of the weld face is out of phase with the excitation, and there is only one node, at the geometric center of the weld face.

U.S. Pat. Nos. 5,707,483 and 5,645,681 describe novel rotary acoustic horns.

In known systems, welding is governed by the various parameters which can be changed to alter the welding process. These parameters include the frequency, amplitude of vibration, the duration of ultrasonic exposure, temperature (which is a function of the frequency), and the pressure between the horn and the anvil.

To properly weld materials, it is necessary to raise the interfacial temperature of the item being welded to allow the operation, such as bonding, to occur. It is also necessary to quench it and reduce the temperature rapidly, after the weld is made, to prevent stress from damaging the bonded area while the bond is still warm. The speed at which the temperature can be increased and decreased is often the limiting factor in the speed of welding.

SUMMARY OF THE INVENTION

The invention is a method of high speed bonding at least one material including at least one thermoplastic component. The method includes applying acoustic energy, using an acoustic horn and an anvil, to the material. The method also includes applying force to at least one of the horn and the anvil to yield a peak pressure between the horn and the anvil of at least $2.068 \times 10^7$ N/m$^2$. The acoustic energy and pressure are applied for a time sufficient to create bonds within the material such that the material is sufficiently quenched before reducing the pressure.

The method can include applying acoustic energy at an amplitude of vibration selected in combination with the frequency of vibration to yield an acoustic velocity of no greater than 4.72 m/s.

The acoustic energy and pressure can be applied for a time sufficient to create bonds in the material such that the material is sufficiently quenched before reducing the pressure. Thermoplastic peak temperatures are reached such that sufficient heating occurs to create acceptable bond strength and the bond area is cooled adequately and in sufficient time to prevent internal and external stresses from adversely affecting bond quality and to prevent bond degradation such as holes or cut edges.

The peak pressure could be at least $3.448 \times 10^7$ N/m$^2$, or at least $6.895 \times 10^7$ N/m$^2$. The total basis weight of the laminates can be at least 200 gm/m$^2$. The acoustic energy can be at a frequency of at least 10,000 Hz, and can be from 14,000 Hz through 32,000 Hz. The acoustic velocity can be no greater than 3.15 m/s.

The method can include continuous welding or plunge welding and the materials can move past the acoustic horn at speeds of more than 30 cm/min.

The material can include woven layers; films; non-wovens; and non-thermoplastic materials which includes at least one of a cotton-based material and a paper-based material.

The anvil dimensions can be selected in combination with the properties of the material being bonded, the amplitude of the applied acoustic energy, the pressure on the anvil, and the thermal conductivities of the horn and anvil.

BRIEF DESCRIPTION OF THE DRAWINGS

The FIGURE is a side view of patterned rotating anvil with a rotary horn.

DETAILED DESCRIPTION

The invention is a method of rapidly bonding (also called welding) materials using acoustic energy using acoustic horns and anvils. In its simplest form, a material 10 passes from an unwind roll 12 to a winder roll 14 between a horn 16 and an anvil 18. As shown in the FIGURE, both the horn 16 and the anvil 18 rotate. The anvil 18 is patterned.

The horn can operate at various frequencies such as those above 10,000 Hz. The horn can be an ultrasonic horn operating at frequencies at or above 20,000 Hz. This method can be used to bond materials which can have low or high loft. (Bonding includes reinforcing, laminating, joining.) Laminates refers to flexible web-type materials and can include two or more layers. Materials which have at least one thermoplastic layer where the total basis weight of the material is at least 200 gm/m$^2$ can be bonded (as can less massive materials). The method can be used on laminates including thermoplastic and non-thermoplastic combinations, such as non-wovens, wovens, films, papers, and cottons.

The method can include applying acoustic energy to the materials at relatively low amplitudes and creating a pressure between the horn and the anvil that is relatively high. A key is the use of very high weld pressures typically in combination with amplitudes that are lower than would typically be used for high speed bonding of high basis weight materials.

The amplitude of vibration and the applied frequency are related; the resulting transfer of energy for a low amplitude and high frequency can be the same as that for a relatively high amplitude and relatively low frequency. These parameters are proportional. That is, increasing the amplitude and decreasing the frequency can yield the same heating.

The rate of transfer of energy from acoustic waves depends on the square of the amplitude and the square of the angular frequency. Because the ultrasonic velocity is the amplitude times the angular frequency, the rate of energy transfer is dependent on the square of the ultrasonic velocity. (The rate of viscoelastic heating in a polymer is proportional to the angular frequency times the square of the amplitude.) Thus, the rate of energy transfer can be the same if one uses twice the frequency but half the amplitude. For example, for an amplitude that is 75 microns peak-to-peak and a frequency of 20,000 Hz, the peak amplitude is 37.5 microns. The angular frequency is $2\pi$ times 20,000 Hz. The ultrasonic velocity is therefore:

$$(37.5 \times 10^{-6} \text{ m}) 2\pi (20,000 \text{ Hz}) = 4.71 \text{ m/s}$$

Throughout the remainder of this specification, the amplitude values are those for systems operating at a frequency of 20,000 Hz. The required amplitude decreases with higher frequencies. The equivalent amplitudes to arrive at the same ultrasonic velocities for other frequency systems can be obtained by multiplying the listed amplitudes by the ratio of 20,000 Hz (the frequency used to obtain the listed amplitudes) and the frequency of interest.

For ultrasonic frequencies of vibration of 20,000 Hz, the method can include applying acoustic energy to the materials at an amplitude of vibration no greater than 75 microns peak-to-peak. Amplitudes of no greater than 50 microns peak-to-peak can be used. These amplitudes are less than those conventionally used, which are typically 75 to 100 microns or more even for lower speed continuous bonding.

The method also includes applying a force to at least one of the horn and the anvil to yield an average pressure between the horn and the anvil of at least $2.068 \times 10^7$ N/m$^2$ (3,000 psi). This pressure is high, and in many instances can be greater than $1.379 \times 10^8$ N/m$^2$ (20,000 psi). These pressures are much more than those currently used, which typically are from $6.895 \times 10^5$ N/m$^2$ (100 psi) to $6.895 \times 10^6$ N/m$^2$ (1000 psi). The force can be created using known methods including pneumatics, hydraulics, mass and gravity, springs, material expansion (such as by piezoelectric or thermal) or by setting a fixed gap between the horn and anvil.

The pressure between the horn and anvil is determined by dividing the force applied to the horn or anvil by the area of the weld site(s) where the material is in contact with the horn and anvil. For plunge welding, dividing the applied force by the weld area in contact between the horn and anvil yields a pressure that is an average over the weld area for that weld (the mechanical alignment variation or welding rate variation of particular weld locations in the weld area can give rise to locally higher or lower forces). Additionally, the applied force can vary during welding. The force for the calculation is the highest force that is applied during the part of the weld cycle where the material is being welded.

For continuous welding, the area is the area of the material in contact with the weld sites between the horn and anvil on the upweb side of the weld nip. This area is the length of the material times the width of the weld sites. The average pressure then is determined by applying the force between the horn and anvil, while keeping the horn, anvil, and material stationary. The horn is vibrated for the short time necessary to create a bond, and the surface area of the resultant weld is measured. If the weld area includes discrete weld pads, then the measured area is the length of the pad times the width times the number of pads bonded. This area measured is about twice the actual area because during a continuous operation the material leaving the weld nip has already been bonded and is thinner; in the static weld test, the material on both the input and output side of the nip is bonded. The applied force is divided by half the measured weld surface area to yield the average pressure. This is an average pressure because the radius of a rotating anvil creates a pressure profile on the material between the horn and anvil as a function of the closure gap and the weld state of the material as it progresses through the nip.

The application of acoustic energy and pressure occurs for a time sufficient to create bonds between the adjacent layers of materials and to sufficiently quench the materials before reducing the pressure. The pressure reduction occurs when the material leaves the weld nip area. The materials must reach thermoplastic peak temperatures to yield sufficient polymer diffusion for compatible materials or melting of at least one polymer to create a bond to another material such as to form a laminate. (This could be, for example, polypropylene flowing into or around a non-melting surface or fiber.) The heating needs to be sufficient to yield diffusion bonding or movement of one material around or into another material's surface to make a mechanical surface bond. Yet the heating need not actually melt the materials.

The bond area must be cooled adequately and quickly before leaving the nip between the horn and the anvil and before relieving the applied force to prevent internal and external stresses from adversely affecting bond quality such as by weakening of the bonds, creating holes, or material melt back. Also, the heating must be sufficiently localized to avoid excessive temperatures at the transition line between the melted or partially melted polymer at the joint and the polymer adjacent to the bond area. The material is not subjected to stresses which can adversely affect the bond quality. Rapid heating without overheating and rapid cooling reduces excessive temperatures in the bond (or seal) and in the periphery of the bond. This increases the strength of the weld and reduces bond degradation such as excessively brittle bonds; overheating at the edges of the bond; and hole formation; it increases the ability of the bond to withstand both internal and external stresses immediately after bonding.

The inventors have found that despite the large body of publicly available information about ultrasonic bonding, there was still an unfilled need to improve the bonding process and to bond at higher speeds. In this method the particular parameters to be optimized and the combinations of levels of each parameter solves a long-felt, unmet need. The method combines very high pressures with relatively low amplitudes of ultrasonic vibration. These characteristics are selected within relatively narrow and previously unknown process windows which permit high speed continuous ultrasonic bonding of web materials. These process windows can also extended to plunge weld applications to improve weld quality.

The method can be varied by optimizing various parameters which can include: ultrasonic amplitude; pressure; exposure time; material properties (such as melt temperatures, absorption coefficients, melt rheology, and thermal conductivities); heat losses (such as by thermal conductivity) to the anvil, the horn, carrier webs, surrounding polymers, absorptive additives, and other locations; and weld geometries. These parameters are selected in combination with each other. Characteristics to vary include the properties of the material being bonded, the amplitude of the applied acoustic energy and the pressure between the horn and anvil, and the thermal conductivities of the horn and anvil. Anvil properties include its length, width, edge radius, surface texture, and thermal conductivity, and the dimensions of the weld sites on the anvil, their orientation and spacing. The specific method is to choose anvil dimensions, then optimize the processing conditions using the material properties. If they are suboptimal, then modify the anvil dimensions. If subsequent iterations are unsuccessful, then investigate material property alternatives.

It is known that weld strength and quality tend to decrease with higher processing speeds and with increases in the web loft and mass during high speed continuous bonding of web-based materials. (Also, the weld quality decreases with increases in the non-woven material basis weight for plunge welding.) Tests by the inventors have demonstrated that this problem exists because the melted web layers do not become adequately quenched before leaving the bonding nip.

In known methods of bonding high loft non-woven materials at high speeds processing conditions are changed to increase the rate of energy going into the weld area, typically by increasing both the applied force and the amplitude of vibration. However, this results in poor quality welds because before the polymer melts to its final weld thickness, the materials to be bonded are excessively warm and are leaving the weld nip. In other words, the cause of the poor quality welds is due to the inability of the process, after the bond occurs, to remove the heat that was required to bond the materials sufficiently fast. Thus, as the welded sample exits from the weld nip, it can retain excessive heat, resulting in weak and distorted bonds (due to stress, strain, and shrinkage).

The inventors have found that by increasing the pressure on the weld site by 5 to 50 times over typical applications one creates a process that is a hybrid between thermal and ultrasonic bonding. It has also been shown to be beneficial for many materials, such as lofty non-wovens, to reduce the weld amplitude by about half of what would normally be desired. When working with less lofty materials, such as woven materials or film, reduced weld amplitude is not critical. Good bonding can be attained by the application of acoustic energy at high pressures without reducing amplitude. The selection of amplitude is material dependent.

This process produces high quality welds and bonds and can do so at relatively high speeds of more than 30 m/min (100 ft/min) with high basis weight materials. These conditions also improve the bonding ability of thinner constructions and allow higher web speeds to be used. Non-woven bonding of 430 gm/m² materials has been demonstrated at speeds of 120 m/min (400 ft/min). Higher speeds are possible because this speed was limited by the capabilities of the equipment used, not the process itself. Typically, higher loft materials, higher web speeds, and lower amplitudes require higher bonding pressure.

Contrary to conventional wisdom, the high pressures and low amplitudes are sufficient to create a diffusion bond; the high pressure rapidly decreases the thickness at the weld site to limit the rate of energy input, to decrease the quantity of heat to be removed, and to reduce the weld thickness to allow the thin weld area to more rapidly give up its heat to the horn and anvil (which serve as heat sinks).

The higher pressures promote freezing of the thin weld area before excessive displacement of the material from the weld site occurs and cuts the weld area or creates a too thin weld. This happens because the heat sinks are proportional to the surface area, and the heat input is proportional to the material mass and its absorption characteristics. As the material thins quickly, the sinks remove heat faster than heat is input and the material freezes. Additional time or energy will not easily cause it to re-melt (because the cooler polymer absorbs less energy). Thus, the seal thickness and the floating gap between the horn and anvil are a result of the material freezing before leaving top dead center area of the anvil. Additional lowering of the temperature also occurs just after top dead center, which reduces the temperature of the periphery of the weld. In other words, using very high pressures and low amplitudes of vibration allows the melt of bonded materials to be quenched before leaving the welding nip.

Some cut and seal operations and some aperturing operations require very high pressures between the horn and anvil, and higher amplitudes. The goal of these operations however is to not allow the materials to freeze in the area where the cutting or aperturing occurs. Thus, these processes differ from bonding in that the freezing and quenching of material is not desired, while in a bonding process it is necessary.

Various changes and modifications can be made in the invention without departing from the scope or spirit of the invention. For example, the method of welding can be continuous welding or plunge welding. The disclosures of all of the patents mentioned in this specification are incorporated by reference.

A support, which can be located at the nodes, allows the use of higher forces than are possible with known horns. The support can be in sliding contact; have a low friction, high PV plastic bearing surface (that stands up to the forces and surface speeds used); thin (so it loses its heat quickly to the support structure); and have a thermally conductive (for example, aluminum) support structure with cooling passages. The support can be rigidly or compliantly mounted and can be a block of aluminum with a concave radius where the bearing material is. Alternatively, multiple supports can rollingly contact the horn while incorporating the thin polymer feature.

There is relative deflection between the horn and the anvil as a thicker portion of the material enters the nip. (The thicker portion can be created by wrinkles, high loft areas, and high mass areas.) This produces an inertial force (which acts as an additional force to the applied force) which resists the relative motion and can weld the thicker portion. The inertial force can help compensate for thicker areas in nonwoven materials. The magnitude of this inertial force can be altered by changing the mass of the horn, the anvil, or both. Preferably the component that is floating and biased toward the other component is the member whose mass is changed. After the thicker section has passed the nip area, the force is less, and with the proper masses it does not become less than the pressures required to bond the thinner material. Alternative systems to achieve the additional force could include dual stage springs; piezoelectric; or staged (progressive) pneumatic or hydraulic systems.

What is claimed is:

1. A method of high speed bonding at least one material including at least one thermoplastic component, the method comprising:

applying acoustic energy, using an acoustic horn and an anvil, to the material;

applying force to at least one of the horn and the anvil to yield a peak pressure between the horn and the anvil of at least $2.068 \times 10^7$ N/m²; and applying the acoustic energy and pressure for a time sufficient to create bonds in the material such that the material is sufficiently quenched before reducing the pressure.

2. The method of claim 1 wherein the step of applying force comprises applying a pressure of at least $3.448 \times 10^7$ N/m².

3. The method of claim 1 wherein the step of applying force comprises applying a pressure of at least $6.895 \times 10^7$ N/m².

4. A method of high speed bonding at least one material including at least one thermoplastic component, the method comprising:

applying acoustic energy, using an acoustic horn and an anvil, to the material at an amplitude of vibration selected in combination with the frequency of vibration to yield an acoustic velocity of no greater than 4.72 m/s; and applying force to at least one of the horn and the anvil to yield a peak pressure between the horn and the anvil of at least $2.068 \times 10^7$ N/m².

5. The method of claim 4 wherein the total basis weight of the material is at least 200 gm/m².

6. The method of claim 4 wherein the steps of applying acoustic energy and applying pressure comprise applying the acoustic energy and pressure for a time sufficient to create bonds in the material such that the material is sufficiently quenched before reducing the pressure.

7. The method of claim 6 wherein the steps of applying acoustic energy and applying pressure comprise applying the acoustic energy and pressure to reach thermoplastic peak temperatures such that sufficient heating occurs to create acceptable bond strength and the bond area is cooled adequately and in sufficient time to prevent internal and external stresses from adversely affecting bond quality and to prevent bond degradation such as holes or cut edges.

8. The method of claim 4 wherein the step of applying acoustic energy comprises applying acoustic energy at a frequency of at least 10,000 Hz.

9. The method of claim 8 wherein the step of applying acoustic energy comprises applying acoustic energy at a frequency of from 14,000 Hz through 32,000 Hz.

10. The method of claim 4 wherein at least one of: the step of applying acoustic energy comprises applying acoustic energy at an amplitude of vibration selected in combination with the frequency of vibration to yield an acoustic velocity of no greater than 3.15 m/s; and the step of applying pressure comprises applying a pressure of at least $6.895 \times 10^7$ N/m$^2$.

11. The method of claim 10 wherein the frequency of vibration is 20,000 Hz.

12. The method of claim 1 wherein the step of applying acoustic energy comprises at least one of continuous and plunge welding.

13. The method of claim 1 wherein the step of applying acoustic energy comprises continuous welding with the materials moving past the acoustic horn at speeds of more than 30 m/min.

14. The method of claim 1 wherein at least one of the components is one of a woven layer; a film; a non-woven; and a non-thermoplastic material.

15. The method of claim 1 wherein all of the components are thermoplastic non-wovens.

16. The method of claim 1 further comprising the step of selecting the anvil dimensions in combination with the properties of the material being bonded, the amplitude of the applied acoustic energy and the pressure on the anvil, and the thermal conductivities of the horn and anvil.

17. A method of high speed bonding at least one material including at least one thermoplastic component wherein the total basis weight of the material is at least 200 gm/m$^2$, the method comprising:

applying acoustic energy, using an acoustic horn and anvil, to the material; and applying force to at least one of the horn and the anvil to yield a peak pressure between the horn and the anvil of at least $2.068 \times 10^7$ N/m$^2$, wherein both applying steps comprise applying the acoustic energy and pressure for a time sufficient to create bonds within the material such that the material is sufficiently quenched before reducing the pressure.

18. The method of claim 1 further comprising the step of at least partially supporting the horn by a support member in at least one of sliding and rolling contact with the horn.

19. The method of claim 1 where the step of applying force comprises choosing an appropriate mass of at least one of the horn and anvil to compensate for intermittent thickness variations of the incoming material, by increasing the force using inertial forces.

* * * * *